US009969232B2

United States Patent
Wollner et al.

(10) Patent No.: US 9,969,232 B2
(45) Date of Patent: May 15, 2018

(54) SUSPENSION STRUT MOUNT

(71) Applicant: Schaeffler Technologies AG & Co. KG, Herzogenaurach (DE)

(72) Inventors: Andreas Wollner, Nuremberg (DE); Rainer Lutz, Markt Erlbach (DE); Ralf Stautner, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 419 days.

(21) Appl. No.: 14/876,076

(22) Filed: Oct. 6, 2015

(65) Prior Publication Data
US 2016/0193888 A1  Jul. 7, 2016

(30) Foreign Application Priority Data

Dec. 3, 2014  (DE) .................. 10 2014 224 700

(51) Int. Cl.
*B60G 15/06* (2006.01)
(52) U.S. Cl.
CPC ......... *B60G 15/062* (2013.01); *B60G 15/067* (2013.01); *B60G 2204/124* (2013.01); *B60G 2204/128* (2013.01); *B60G 2204/418* (2013.01)
(58) Field of Classification Search
CPC ............... B60G 15/067; B60G 15/068; B60G 2204/128; B60G 2204/418; F16C 2326/05
USPC .............. 280/124.155, 124.157; 24/DIG. 38; 220/326; 292/DIG. 38
See application file for complete search history.

(56) References Cited

U.S. PATENT DOCUMENTS

| 4,138,151 A | * | 2/1979 | Nakao | E05C 19/066 |
| | | | | 292/341.12 |
| 5,390,811 A | * | 2/1995 | Ogino | B65D 21/0223 |
| | | | | 206/445 |
| 5,628,533 A | * | 5/1997 | Hill | B65D 50/046 |
| | | | | 292/80 |
| 6,296,396 B1 | * | 10/2001 | Schwarzbich | B60G 15/067 |
| | | | | 384/480 |
| 2006/0215945 A1 | * | 9/2006 | Miyata | B60G 15/068 |
| | | | | 384/420 |
| 2011/0187071 A1 | * | 8/2011 | Corbett | B60G 15/068 |
| | | | | 280/124.155 |
| 2011/0221158 A1 | * | 9/2011 | Stautner | B60G 15/068 |
| | | | | 280/124.147 |
| 2011/0262070 A1 | | 10/2011 | Zernickel et al. | |
| 2015/0003761 A1 | * | 1/2015 | Nagashima | F16C 33/74 |
| | | | | 384/297 |

FOREIGN PATENT DOCUMENTS

DE  102010015712  10/2011

* cited by examiner

*Primary Examiner* — Ruth Ilan
(74) *Attorney, Agent, or Firm* — Volpe and Koenig, P.C.

(57) ABSTRACT

A suspension strut mount (1), with a mount arranged between a guide ring (2) and a cap (3). The guide ring (2) and the cap (3) are connected to each other by a snap-on connection (5) that has at least one torsion snap-fit hook (6, 21) that is arranged via a holder (7) that can be torsionally bent on one of the guide ring (2) or the cap (3) and engages, in the assembled state, in an undercut (8) on the other of the guide ring (2) or the cap (3).

8 Claims, 2 Drawing Sheets

SUSPENSION STRUT MOUNT

INCORPORATION BY REFERENCE

The following documents are incorporated herein by reference as if fully set forth: German Patent Application No. 102014224700.4, filed Dec. 3, 2014.

BACKGROUND

The invention relates to a suspension strut mount, with a mount arranged between a guide ring and a cap, wherein the guide ring and the cap are connected to each other by a snap-on connection.

A suspension strut mount that is known, for example, from DE 10 2010 015 712 A1, is typically used for holding a suspension strut with which, in particular, a steerable wheel, for example, of a motor vehicle, is supported relative to a chassis. The suspension strut comprises a telescoping shock absorber with a piston rod that can move guided in a cylinder and a helical spring that surrounds the shock absorber and acts as a vehicle supporting spring. The helical spring is mounted between the spring plate of the suspension strut mount and another spring plate that is connected to the cylinder of the shock absorber. The suspension strut, i.e., the shock absorber and the helical spring, are thus supported together by the suspension strut mount so that they can rotate relative to the chassis. The suspension strut mount allows a certain movement of the suspension strut including the spring plate supporting the helical spring relative to the chassis.

In the suspension strut mount known from DE 10 2010 015 712 A1, the guide ring and the cap are connected by a snap-on connection. For example, the guide ring has one or more snap-on hooks that can be moved radially inward for assembly until they engage in an undercut of the cap. For the design of such a suspension strut mount, the snap-on connection is constructed so that it has a certain disassembly force. The disassembly force is understood to be the force needed to separate the two housing parts. Conventional snap-on connections hit their limits, however, when a higher disassembly force is required.

SUMMARY

The invention is therefore based on the problem of disclosing a suspension strut mount that has an increased disassembly force.

To address this task, according to the invention it is provided for a suspension strut mount of the type noted above, that the snap-on connection has at least one torsion snap-on hook that is arranged with a twistable holder either on the guide ring or on the cap and engages, in the assembled state, in an undercut of the other component.

The invention touches on the recognition that a higher disassembly force can be achieved by replacing a conventional snap-on hook that is loaded with bending forces during disassembly by a torsion snap-on hook in which, during disassembly, a torsion load is applied. The torsion snap-on hook has a holder that can be torsionally bent on which the actual snap-on hook is attached. Thus, for disassembly, primarily the twistable holder is stressed so that it can receive higher disassembly forces than a conventional snap-on connection.

The holder of the snap-on connection of the suspension strut mount according to the invention is preferably constructed so that it can be torsionally bent for axial assembly or disassembly of the guide ring and the cap. The holder is deformed accordingly during disassembly, while for conventional snap-on connections, a bending load is usually applied to the snap-on hook.

It is part of the scope of the invention that the holder that can be torsionally bent has a web that extends in the circumferential direction of the suspension strut mount and on which the torsion snap-on hook is mounted. The web can extend, for example, from both sides of the torsion snap-on hook, wherein the two web sections form at least approximately a common axis when a torsion load is applied.

One particularly preferred construction of the invention provides that the web of the holder that can be torsionally bent is spaced apart from the component on which the holder that can be torsionally bent is mounted. The holder that can be torsionally bent can be arranged either on the guide ring or on the cap. The other component then has the undercut in which the torsion snap-on hook engages in the assembled state. When the web of the holder that can be torsionally bent is spaced apart, for example, from the guide ring, the web can be torsionally bent during disassembly. Here, the disassembly force is introduced into the web via the torsion snap-on hook. The disassembly force here generates a torque that is absorbed by the deformation of the web. One particularly preferred construction is one in which the torsion snap-on hook is arranged on the cap and the guide ring has an undercut. However, a reversed construction is also possible.

In another construction of the invention, it can be provided that the web has, at least in some sections, a circular cross section. For torsion loading, the cylindrical web is deformed elastically. Alternatively, the web can also have a quadratic or polygonal cross section.

In the scope of the invention it can also be provided that the component on which the torsion snap-on hook is arranged has a projection pointing toward the torsion snap-on hook, wherein the torsion snap-on hook contacts this projection during disassembly of the suspension strut mount. This projection is here used as a block or blocking area that limits a rotation of the torsion snap-on hook during disassembly. For the presence of a disassembly force, i.e., a tensile force acting in the axial direction, first the torsion snap-on hook that is mounted at a distance from the associated component on the holder that can be torsionally bent is bent elastically, wherein the torsion snap-on hook performs at least approximately a rotational movement. When the torsion snap-on hook contacts the stationary projection, the disassembly force required for separation increases significantly, because then an (additional) elastic deformation of the torsion snap-on hook is required. Thus, by selecting the radial length of the projection, the disassembly force can be defined and/or influenced.

It is within the scope of the invention that the torsion snap-on hook has on the inside and/or outside in the radial direction a section made from a softer plastic material than the other areas of the torsion snap-on hook. Of course, the suspension strut mount according to the invention can also have a section made from softer plastic material both on the inside and outside in the radial direction. The softer plastic material and the plastic material used for other areas of the torsion snap-on hook and, if necessary, the suspension strut mount can be made by a two-component injection molding process. The softer plastic material acts as a damper and reduces noises that might otherwise occur. The suspension strut mount according to the invention can have multiple torsion snap-on hooks arranged distributed around the circumference. For example, 2, 3, 4, or 6 torsion snap-on hooks could be provided distributed around the circumference. Preferably, the multiple torsion snap-on hooks are distributed equidistant around the circumference.

For the suspension strut mount according to the invention, the mount can be formed as a sliding bearing or rolling bearing.

BRIEF DESCRIPTION OF THE DRAWINGS

The invention will be explained below using embodiments with reference to the drawings. The drawings are schematic diagrams and show.

DETAILED DESCRIPTION OF THE PREFERRED EMBODIMENT

Figure 1:
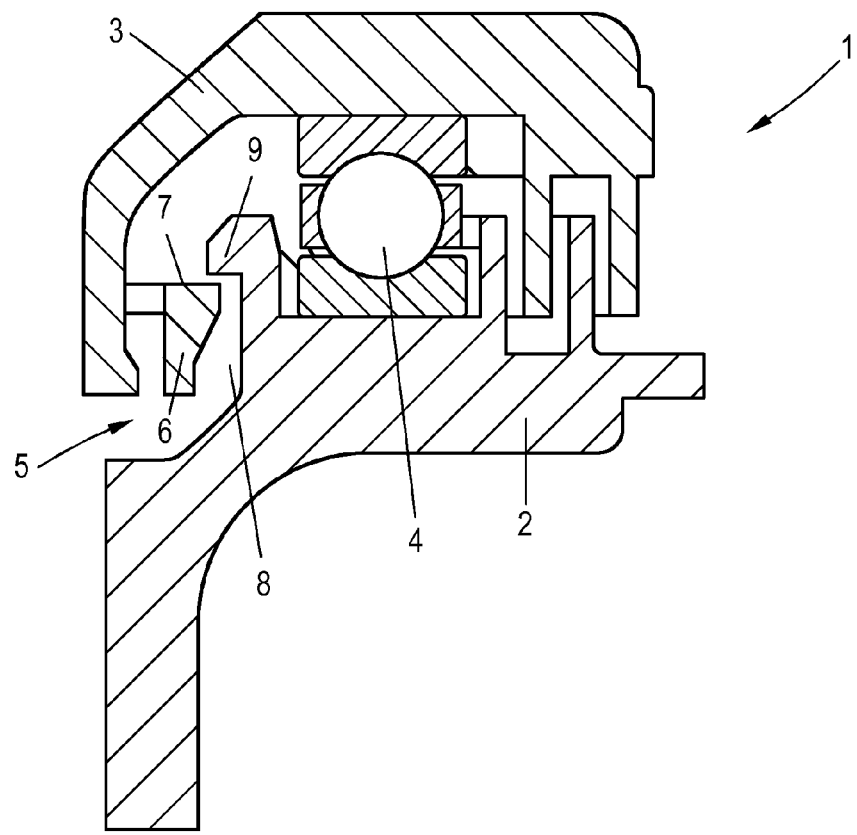
FIG. 1 is a sectioned view of a detail of one embodiment of a suspension strut mount according to the invention.

FIG. 1 is a sectioned view of a detail of a suspension strut mount 1 that has a guide ring 2 and a cap 3, between which a rolling bearing 4 is arranged. The guide ring 2 and the cap 3 are connected to each other by a snap-on connection 5 that has a torsion snap-on hook 6 that is arranged, by a holder 7 that is hidden in the view of FIG. 1 on the cap 3. The guide ring 2 has an undercut 8 in which the torsion snap-on hook 6 engages. The guide ring 2 has a projection 9 that extends outward in the radial direction and connects to the undercut 8 and prevents disassembly of the cap 3 from the guide ring 2 due to an axial force.

Figure 2:
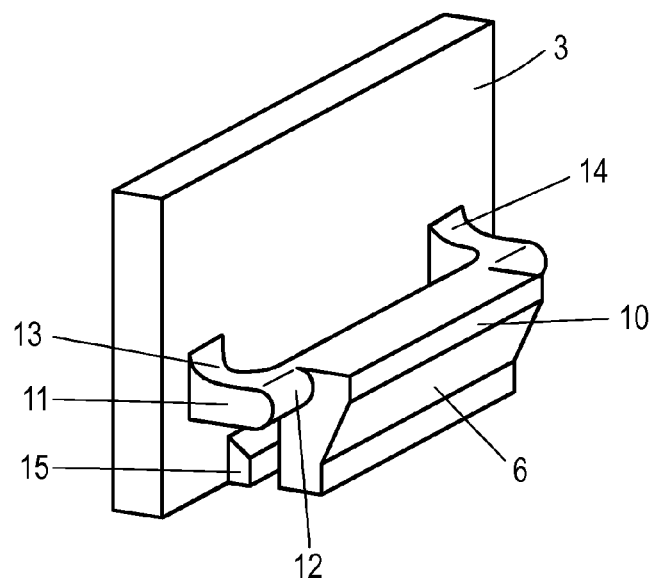
FIG. 2 is a perspective view of a torsion snap-on hook of the suspension strut mount shown in FIG. 1.

FIG. 2 is a perspective view and shows the torsion snap-on hook 6 arranged on the inside of the cap 3. In FIG. 2 it can be seen that the torsion snap-on hook 6 has a snap-on tab 10 that points inward in the radial direction and contacts the projection 9 during disassembly. The torsion snap-on hook 6 is mounted by means of a holder 11 that can be torsionally bent on the cap 3 that has a web 12 extending in the circumferential direction of the suspension strut mount 1 and on which the torsion snap-on hook 6 is mounted. In FIG. 2 it can be seen that the web 12 extends between two radial web sections 13, 14 spaced apart from the inside of the cap 3. In the shown embodiment, the web 12 has a circular cross section.

Figure 3:
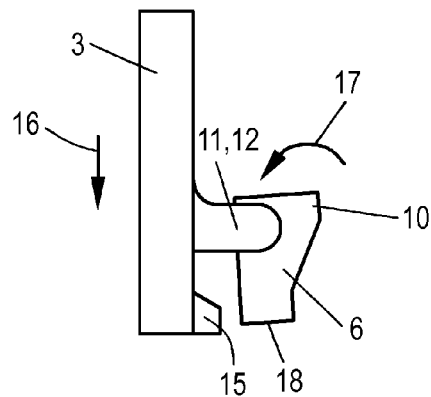
FIG. 3 is a view similar to that of FIG. 1, which shows the deformation of the torsion snap-on hook during assembly.

Underneath the holder 11 that can be torsionally bent, on the inside of the cap 3 there is a projection 15 that extends inward in the radial direction. FIG. 3 is a view similar to that in FIG. 1 and shows the torsion snap-on hook during assembly. For assembly, the cap 3 moves in the axial direction along the arrow 16. With its snap-on tab 10, the torsion snap-on hook 6 here contacts against the projection 9 of the guide ring 2. In this way, the torsion snap-on hook 6, more precisely the holder 11 that can be torsionally bent, in particular, its web 12, is torsionally bent in the rotational direction indicated by an arrow 17. In FIG. 3 it can be seen that the free end 18 of the torsion snap-on hook 6 is moved away from the cap-side projection 15. Thus, sufficient clearance is provided for the end 18 of the torsion snap-on hook 6 during assembly.

Figure 4:
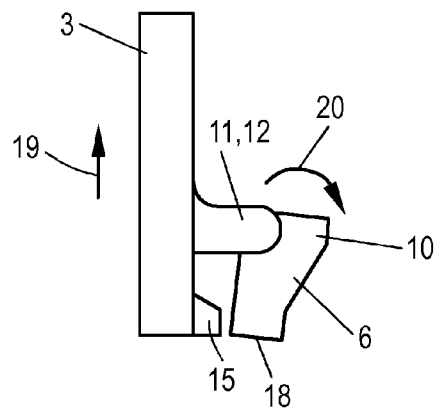
FIG. 4 is a view similar to that of FIG. 3, which shows the deformation of the torsion snap-on hook during disassembly.

FIG. 4 shows the torsion snap-on hook 6 during disassembly. For the disassembly, the cap 3 moves in the direction of the arrow 19; thus the movement is the reverse of the movement during assembly shown in FIG. 3.

During disassembly, the snap-on tab 10 of the torsion snap-on hook 6 contacts against the projection 9 of the guide ring 2. Because the torsion snap-on hook 6 is held on one side, it rotates about the web 12 of the holder 11 that can be torsionally bent in the direction indicated by the arrow 20 as the axis of rotation. For this elastic deformation of the web 12, the free end 18 of the torsion snap-on hook 6 moves toward the cap-side projection 15 that acts as a block or blocking area. As soon as the free end 18 of the torsion snap-on hook 6 contacts the projection 15, further rotation of the torsion snap-on hook 6 is prevented. Disassembly is then possible only by greatly increasing the effective disassembly force that leads to a deformation of the torsion snap-on hook at another location, for example, in the area of the holder 11 that can be torsionally bent.

Figure 5:
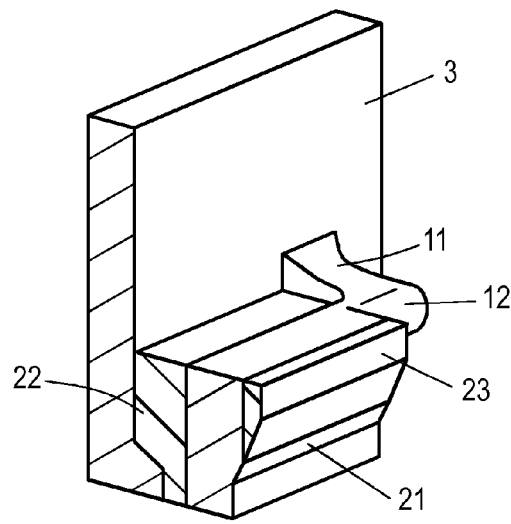
FIG. 5 is another embodiment of a suspension strut mount according to the invention that has, in the area of the torsion snap-on hook, areas with a softer plastic material.

FIG. 5 is a diagram that is similar to FIG. 2 and shows a detail of a torsion snap-on hook 21 in a perspective view. FIG. 5 is a sectioned view; the section plane here runs through the torsion snap-on hook 21. In agreement with the embodiment shown in FIG. 2, the torsion snap-on hook 21 has the holder 11 that can be torsionally bent and the web 12. Instead of a clearance between the web 12 and the cap 3, however, this area is filled with a plastic material 22 that is softer than the other areas of the torsion snap-on hook 21. Thus, two different plastics are used for production in a two-component injection molding process. There is also a snap-on tab 23 that has a trapezoidal cross section made from softer plastic material. The softer plastic material has a lower modulus of elasticity than the other areas of the torsion snap-on hook 21. The areas filled with the soft component increase the disassembly force and reduce noise, in particular, rubbing noises.

LIST OF REFERENCE SYMBOLS

1 Suspension strut mount
2 Guide ring
3 Cap
4 Rolling bearing
5 Snap-on connection
6 Torsion snap-on hook
7 Holder
8 Undercut
9 Projection
10 Snap-on tab
11 Holder
12 Web
13 Web section
14 Web section
15 Projection
16 Arrow
17 Arrow
18 End
19 Arrow
20 Arrow
21 Torsion snap-on hook
22 Plastic material
23 Snap-on tab

The invention claimed is:

1. A suspension strut mount (1), comprising a mount arranged between a guide ring (2) and a cap (3), the guide ring (2) and the cap (3) are connected to each other by a snap-on connection (5) that includes at least one torsion snap-on hook (6,21) that is arranged via a holder (7) that is torsionally bendable located on one of the guide ring (2) or the cap (3) and engages, in an assembled state, in an undercut (8) on the other of the guide ring (2) or the cap (3), wherein the holder (7) that is torsionally bendable has a web (12) that extends in a circumferential direction of the suspension strut mount (1) and to which the torsion snap-on hook (6,21) is attached.

2. The suspension strut mount according to claim 1, wherein the holder (7) is torsionally bendable for axial assembly or disassembly of the guide ring (2) and the cap (3).

3. The suspension strut mount according to claim 1, wherein the web (12) of the holder (7) that is torsionally bendable is arranged at a distance from the one of the guide ring (2) or the cap (3) on which the holder (7) that is torsionally bendable is arranged.

4. The suspension strut mount according to claim 1, wherein the web (12) has a circular cross section at least in some sections.

5. The suspension mount according to claim 1, wherein the one of the guide ring (2) or the cap (3) on which the torsion snap-on hook (6, 21) is arranged has a projection (15) that points toward the torsion snap-on hook (6, 21) and against which the torsion snap-on hook (6, 21) contacts for disassembly of the suspension strut mount (1).

6. The suspension strut mount according to claim 1, comprising multiple ones of the torsion snap-on hooks (6, 21) arranged distributed around a circumference.

7. The suspension strut mount according to claim 1, wherein the mount comprises a sliding bearing or rolling bearing (4).

8. A suspension strut mount (1), comprising a mount arranged between a guide ring (2) and a cap (3), the guide ring (2) and the cap (3) are connected to each other by a snap-on connection (5) that includes at least one torsion snap-on hook (6,21) that is arranged via a holder (7) that is torsionally bendable located on one of the guide ring (2) or the cap (3) and engages, in an assembled state, in an undercut (8) on the other of the guide ring (2) or the cap (3), wherein the torsion snap-on hook (6,21) has on at least one of an inside or an outside in a radial direction, a section produced from a softer plastic material than other regions of the torsion snap-on hook (6,21).

\* \* \* \* \*